United States Patent [19]

Thomasen

[11] Patent Number: 5,691,516
[45] Date of Patent: Nov. 25, 1997

[54] TUNABLE VIBRATION ABSORBER

[75] Inventor: Leonard Thomasen, Cotati, Calif.

[73] Assignee: Tekna Sonic, Inc., Cotati, Calif.

[21] Appl. No.: 683,894

[22] Filed: Jul. 19, 1996

Related U.S. Application Data

[63] Continuation-in-part of Ser. No. 263,927, Jun. 21, 1994, Pat. No. 5,583,324.

[51] Int. Cl.$^6$ ........................................ A47B 81/06
[52] U.S. Cl. ........................ 181/199; 181/207; 181/208
[58] Field of Search .............................. 181/207, 208, 181/209, 151, 199; 188/378, 379, 380; 248/559

[56] References Cited

U.S. PATENT DOCUMENTS

| | | |
|---|---|---|
| 2,270,902 | 1/1942 | Rubissow . |
| 2,541,159 | 2/1951 | Geiger . |
| 3,102,722 | 9/1963 | Hamontre . |
| 3,160,549 | 12/1964 | Caldwell . |
| 3,169,881 | 2/1965 | Bodine . |
| 3,386,527 | 6/1968 | Daubert . |
| 3,388,772 | 6/1968 | Marsh . |
| 4,232,762 | 11/1980 | Bschorr . |
| 4,392,681 | 7/1983 | Raquet . |
| 4,627,635 | 12/1986 | Koleda . |
| 4,734,323 | 3/1988 | Sato . |
| 4,744,547 | 5/1988 | Härtel . |
| 4,778,028 | 10/1988 | Staley . |
| 5,170,436 | 12/1992 | Powell ........................... 181/199 X |
| 5,240,221 | 8/1993 | Thomasen . |

FOREIGN PATENT DOCUMENTS

| | | |
|---|---|---|
| 1071364 | 12/1959 | Germany . |
| 0186191 | 9/1985 | Japan ............................. 181/151 |
| 6152153 | 3/1986 | Japan . |
| 2021501 | 12/1979 | United Kingdom . |

*Primary Examiner*—Khanh Dang
*Attorney, Agent, or Firm*—Thomas M. Freiburger

[57] ABSTRACT

A vibration absorbing device for a speaker enclosure is tuned upon installation to the speaker enclosure to achieve maximum attenuation of vibrations in a selected frequency range. The vibration absorber, which includes a series of vibration damping plates separated by spacers, is positioned at varying degrees of overhang on a mounting plate on a panel of the enclosure until attenuation of the desired frequency band is maximized. Then the absorber is secured to the speaker enclosure with an appropriately sized permanent mounting plate.

2 Claims, 5 Drawing Sheets

FIG. 7

| PANEL RESONANCE FREQUENCY | VALUE FOR DIMENSION X | VALUE FOR DIMENSION Y |
|---|---|---|
| 40 Hz | 1 1/2" | 3 1/4" |
| 47 Hz | 1 5/8" | 3 1/8" |
| 55 Hz | 1 3/4" | 3" |
| 62 Hz | 1 7/8" | 2 7/8" |
| 70 Hz | 2" | 2 3/4" |
| 77 Hz | 2 1/8" | 2 5/8" |
| 85 Hz | 2 1/4" | 2 1/2" |
| 92 Hz | 2 3/8" | 2 3/8" |
| 100 Hz | 2 1/2" | 2 1/4" |
| 107 Hz | 2 5/8" | 2 1/8" |
| 115 Hz | 2 3/4" | 2" |
| 122 Hz | 2 7/8" | 1 7/8" |
| 130 Hz | 3" | 1 3/4" |
| 137 Hz | 3 1/8" | 1 5/8" |
| 145 Hz | 3 1/4" | 1 1/2" |
| 152 Hz | 3 3/8" | 1 3/8" |
| 160 Hz | 3 1/2" | 1 1/4" |
| 167 Hz | 3 5/8" | 1 1/8" |
| 175 Hz | 3 3/4" | 1" |
| 182 Hz | 3 7/8" | 7/8" |
| 195 Hz | 4" | 3/4" |
| 200 Hz to 1KHz | FULL BASE CONTACT | — |

TUNABLE VIBRATION ABSORBER

BACKGROUND AND SUMMARY OF THE INVENTION

This application is continuation-in-part of application Ser. No. 263,927, filed Jun. 21, 1994, now U.S. Pat. No. 5,583,324. The entire disclosure of that application, including the drawings, is incorporated herein by reference.

Applications Ser. Nos. 263,927, filed Jun. 21, 1994, now U.S. Pat. No. 5,583,324, and 193,299, filed Feb. 8, 1994, now U.S. Pat. No. 5,629,503, disclose vibration dampening devices particularly for use with speaker cabinets, including speakers mounted in walls.

This application describes an improvement over the disclosures of the two copending applications, an improvement whereby a vibration absorber according to the invention of either of those applications is tunable upon installation into a speaker cabinet or other speaker enclosure.

The stack of viscoelastic damping plates secured together with spacers preferably at one edge, is connected to the speaker panel with a tuning mounting plate between the damping unit's base or mounting plate and the speaker panel. As in the copending applications, the stack of mounting plates is secured together and to the unit's mounting plate at one edge. Upon installation on a panel of a speaker enclosure, the edge of the unit where all plates are secured together is cantilevered over the edge of the tuning, mounting plate. The degree of cantilever is adjusted during installation, to find the optimum position at which vibration is best absorbed. The vibration absorbing unit is then fixed in this position of optimum cantilever.

It is therefore among the objects of the invention to improve the vibration absorbing capability of vibration damping units such as described in applications Ser. Nos. 263,927, now U.S. Pat. No. 5,583,324, and 193,299 now U.S. Pat. No. 5,629,503, with a simple and efficient procedure. These and other objects, advantages and features of the invention will be apparent from the following description of a preferred embodiment, considered along with the accompanying drawings.

DESCRIPTION OF THE DRAWINGS

FIG. 7 is a table showing position dimensions for approximately optimal mounting of a particular model of vibration damping unit.

DESCRIPTION OF PREFERRED EMBODIMENTS

Figure 1:
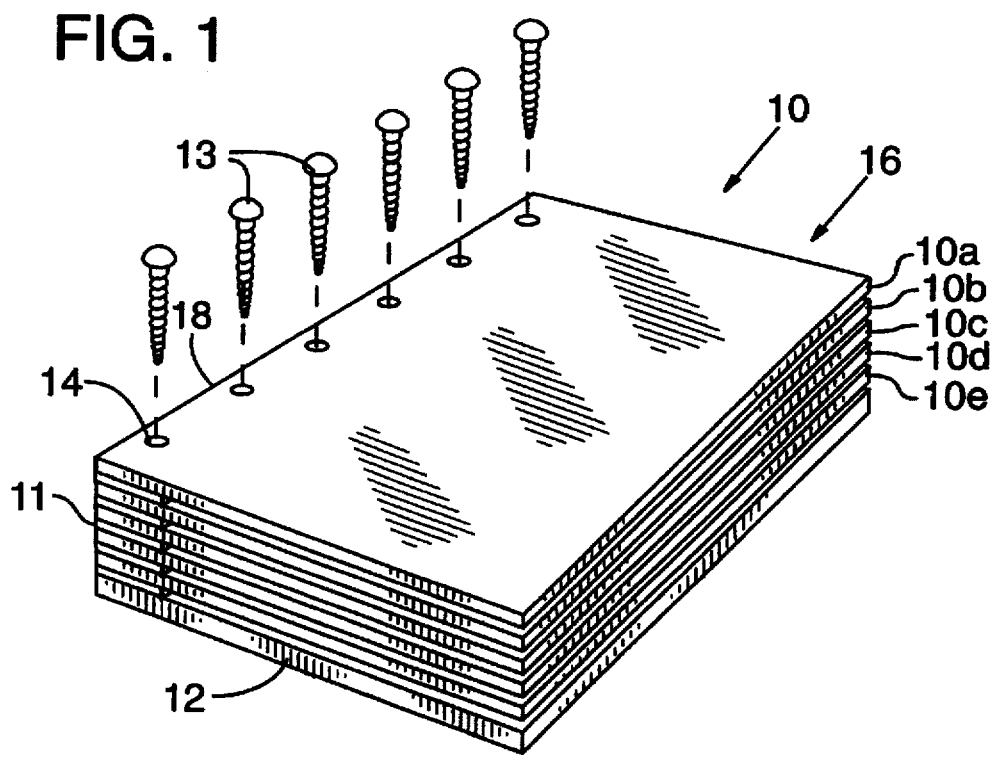
FIG. 1 is a perspective view showing a vibration damping unit with which the procedure and apparatus of the invention may be used.

In the drawings, FIG. 1 shows a vibration damping unit 10 in accordance with application Ser. No. 263,927, now U.S. Pat. No. 5,583,324, the disclosure of which is incorporated herein by reference. The damping unit 10 includes a series of vibration damping plates 10a, 10b, 10c, 10d and 10e (the number of plates can be greater or smaller), secured together and to a mounting plate 12 via spacers 11 and fasteners 13 passing through holes 14 at one edge of the assembly. Outer edges of the damping plates 10a–10e, generally identified by the reference number 16 in FIG. 1, are freely suspended, i.e., cantilevered, the plates and the mounting plate 12 being secured together only at the left edge 18 of the assembly as seen in the drawing. This construction is in accordance with an embodiment described in the copending application incorporated by reference.

Figure 2:
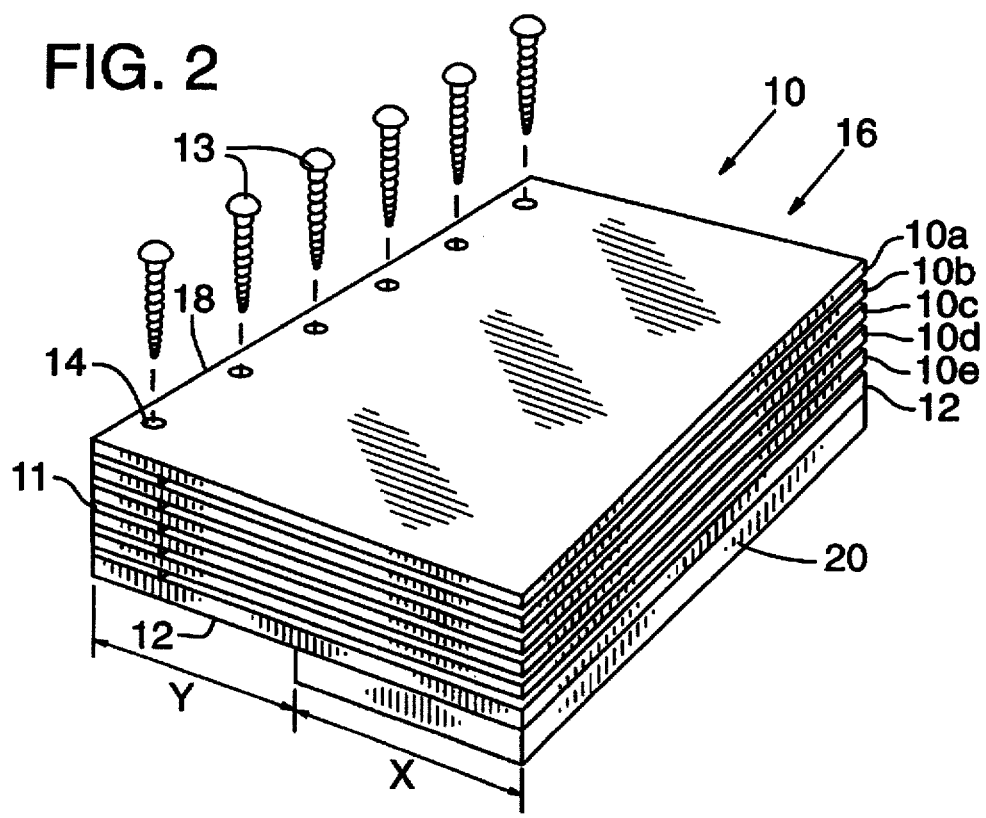
FIG. 2 is a similar perspective view, showing the unit of FIG. 1 positioned against a tuning mounting plate, for installation on a panel of a speaker enclosure.

FIG. 2 is similar to FIG. 1 but shows the damping unit 10 secured to a separate spacer mounting plate 20 which serves as a tuning mounting plate for the vibration damping assembly. The tuning mounting plate 20 serves as a spacer between the unit's mounting plate or base plate 12 and a panel of a speaker enclosure (not shown). As can be seen from the drawing, this effects a cantilever of the region of the unit 10 which is adjacent to the spacers 11, that is, the left edge 18 as seen in the drawing. A cantilever distance Y is variable according to how the unit 10 is mounted on the tuning spacer 20. This variable distance Y is free to resonate independently from the plates 10a, 10b, etc. which are also free to resonate relative to secured-together edge 18 of the damping unit. The intermediate tuning plate or spacer 20, which is preferably made of a one-fourth inch thick, high density material such as fiberboard, is bonded securely to the mounting plate 12, which may be accomplished using a solvent such as acetone. Acetone, by its chemical action, momentarily melts (liquifies) the surface of the plastic mounting plate 12 thereby causing the mounting plate 12 and the tuning mounting plate or spacer 20 to be permanently fused together.

In the assembly shown in FIG. 2, the tuning mounting plate or spacer 20 may be assigned a specific length by varying the dimension shown as X in FIG. 2, thereby providing the assembly of FIG. 2 with the cantilever portion described in length by the dimension Y. Varying of the dimension Y therefore assigns to the structure a mass-compliance product factor which causes the structure to resonate at a specific frequency residing in the lower range of the audible sound spectrum.

It has been found by means of accelerometer measurements that the structure of FIG. 2 is able to attenuate enclosure panel vibrations to a far greater degree in the lower frequencies of the audible sound spectrum by inclusion of the tuning mounting plate or spacer 20 between the damping unit and the panel. It has also been found by these accelerometer measurements that the structure of FIG. 2, like the structure of FIG. 1, is able to attenuate enclosure panel vibrations to a far greater degree in the higher frequencies by excluding the intermediate spacer member or tuning mounting plate 20.

Figure 3:
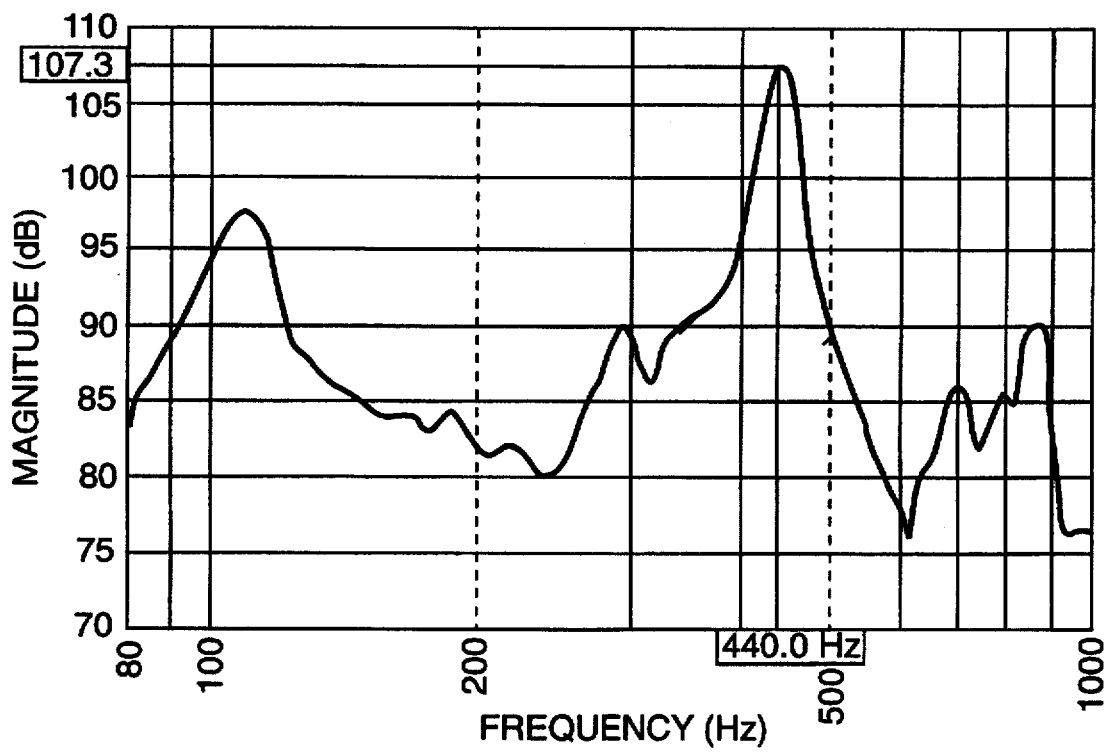
FIGS. 3, 4 and 5 are graphs showing amplitudes of vibration versus frequency, in reference to the tuning method of the invention.
Figure 4:
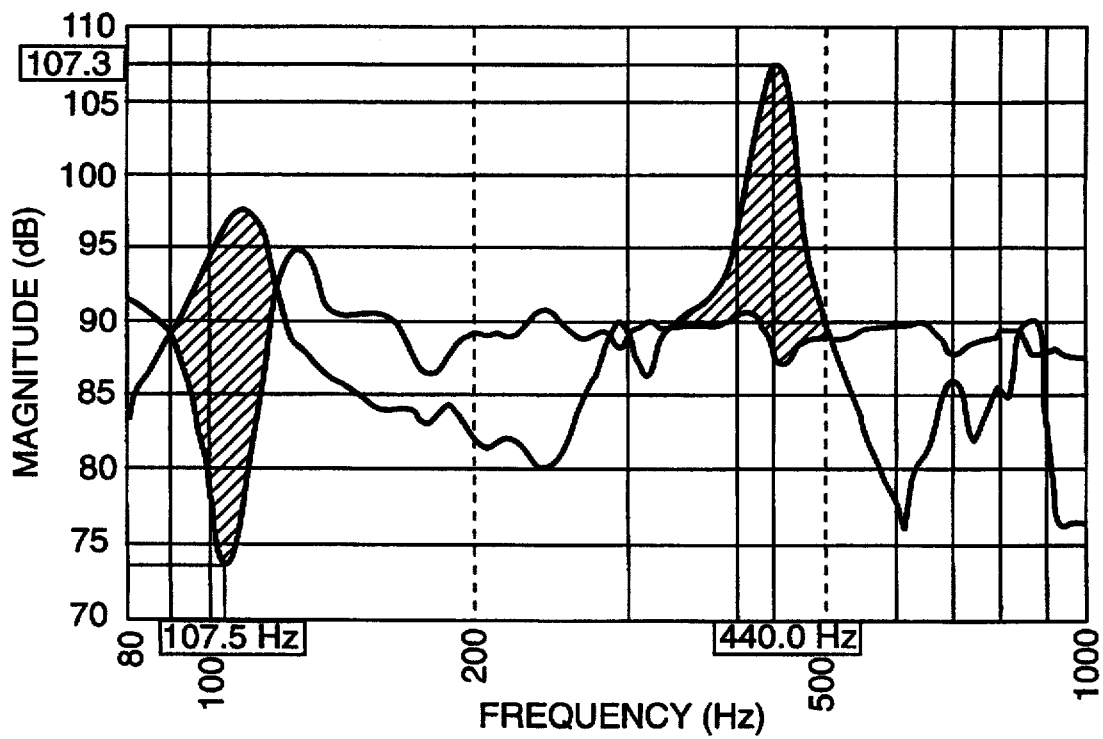

FIG. 3 shows the frequency spectrum from 80 Hz to 1000 Hz for a sweep signal applied to a laboratory test panel. FIG. 4 compares the reference spectrum of FIG. 3 with one embodiment of FIG. 2 attached to the test panel, wherein the tuning mounting plate 20 was cut to give the dimension X a length of 2 and 5/8 inches, for a particular vibration damping unit. It can be seen in FIG. 4 that the peak panel resonance at 108 Hz was attenuated by approximately 28 decibels.

Figure 5:
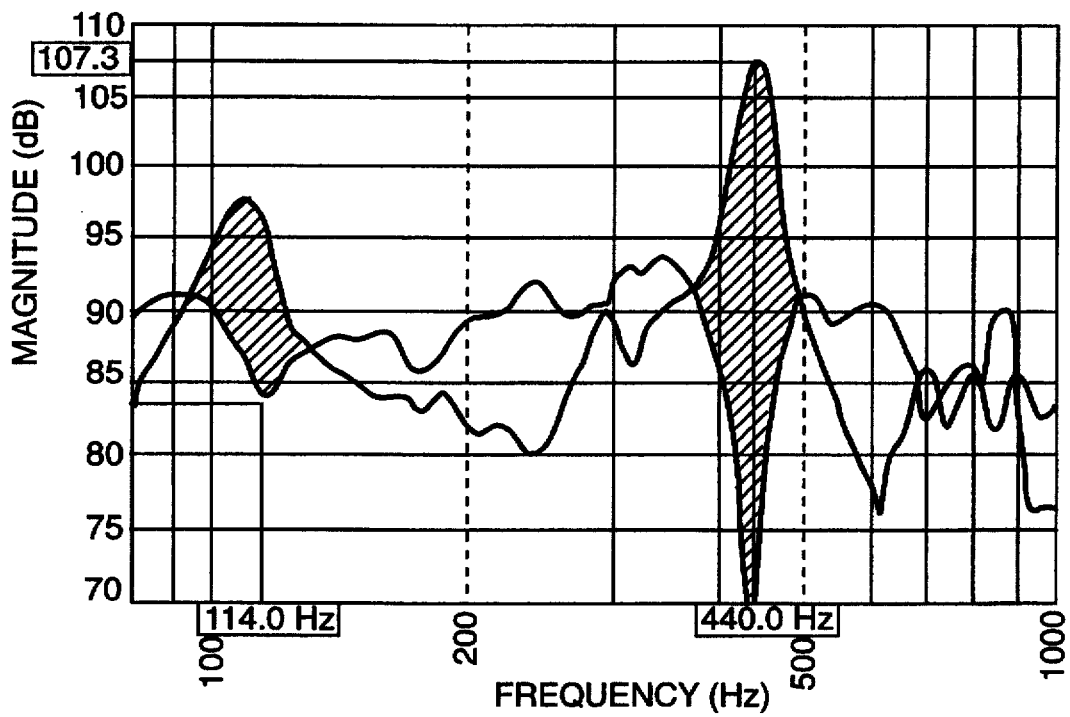

FIG. 5 compares the reference spectrum of FIG. 3 with a situation wherein a damping unit such as shown in FIG. 1 was attached to the test panel, without the spacer or tuning mounting plate 20. FIG. 5 shows that the peak panel resonance at 440 Hz was attenuated by approximately 37 decibels.

Thus, optimum vibration attenuation in speaker enclosures can be attained by using at least two of the damping assembles 10 of the invention, one secured with the damping mounting plate or spacer 20 and one secured without.

It will be seen by those skilled in the art to which this invention relates that the structure of FIG. 2 is comprised of spacers 11 causing the portion of the structure so constructed by the use of spacers to form a monolithic mass whose natural resonance frequency is governed by the cantilevered distance Y. Decreasing the distance Y will raise the natural resonance frequency of the monolithic mass while increasing the distance Y lower the natural resonance frequency of the monolithic mass formed by spacers 11. A procedure for optimizing the assembly shown in FIG. 2, i.e., selecting the correct dimensions X and Y, is described with reference to FIGS. 6, 6A and 6B. The installer, using standard accelerometer measurement techniques, finds the frequency and location on the outside of a speaker enclosure where the peak panel resonances occur. The installer then refers to the tuning chart of FIG. 7, which is given here as an example for a particular model of vibration damping unit 10. A value is selected for X that will tune the absorber to the frequency of maximum panel resonance.

Figure 6:
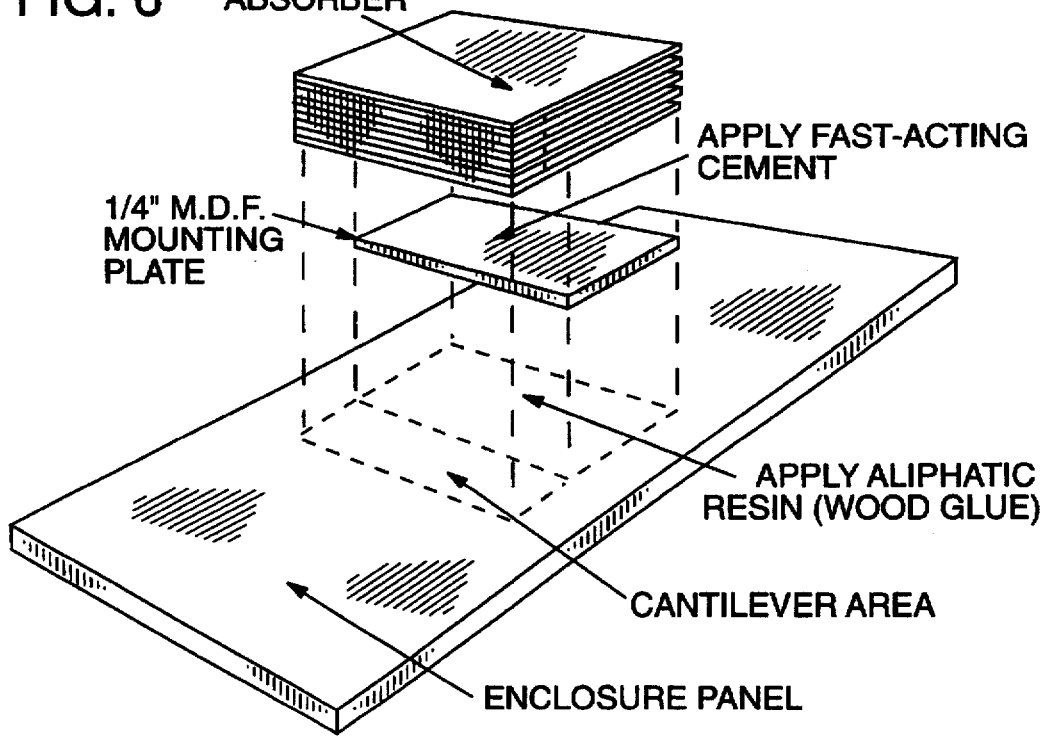
FIG. 6 is a perspective, exploded view showing a procedure for assembling a vibration damping unit to a speaker enclosure panel in accordance with the invention.
Figure 6A:
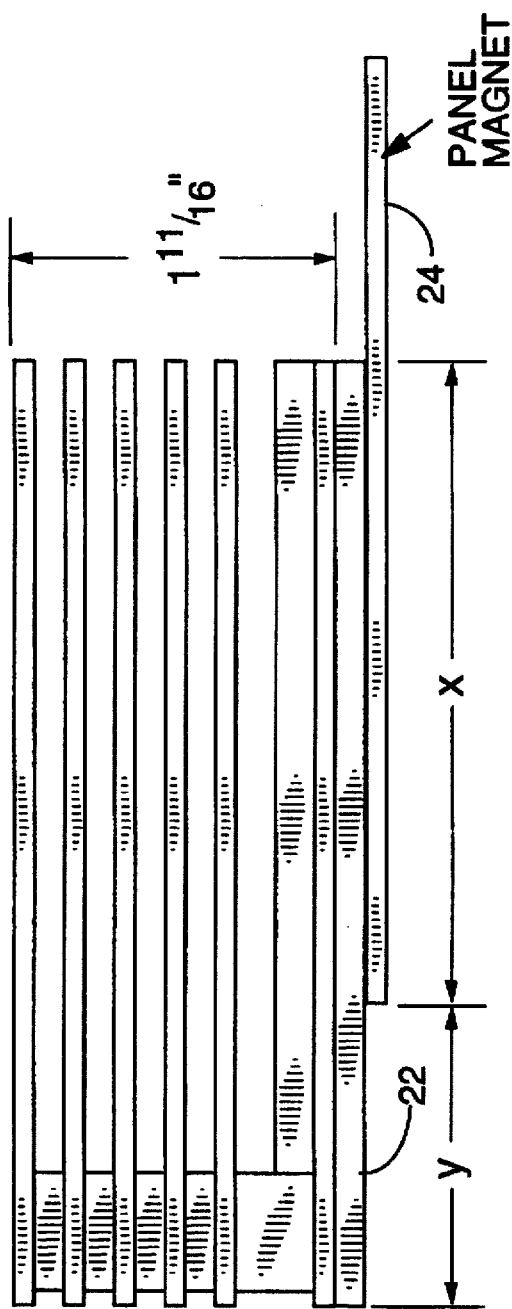
FIG. 6A is an elevation view illustrating a technique for optimally tuning the damping device for lower frequencies.
Figure 6B:
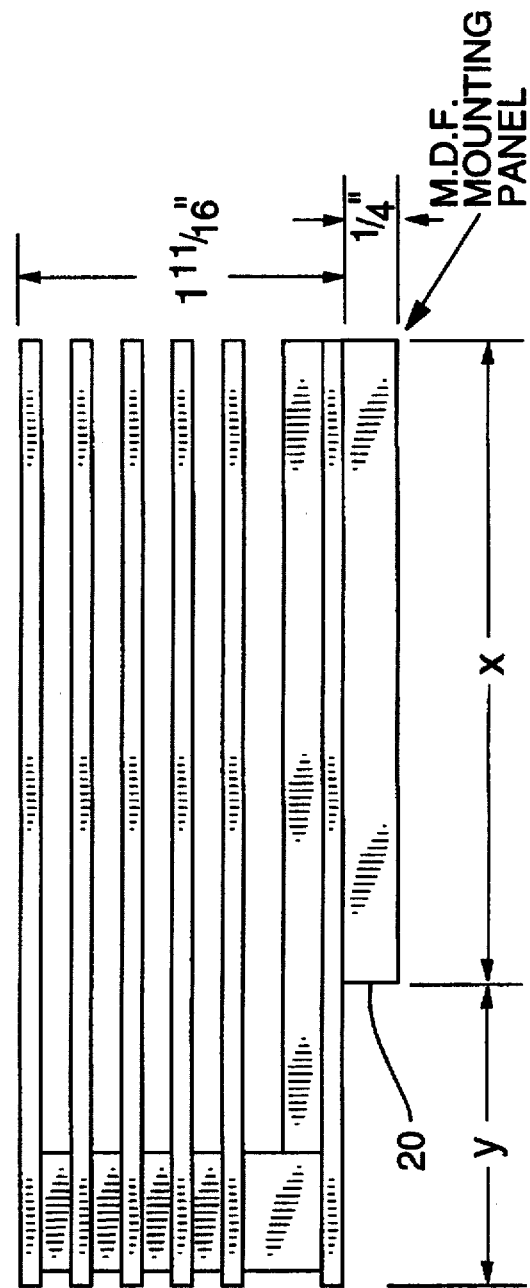
FIG. 6B is a view similar to FIG. 6A, showing permanent illustration of the damping unit at optimal damping position.

As a preliminary step in installation and to assure optimum tuning, the user can first secure the damping unit 10 and tuning mounting plate 20 to the panel using a temporary device such as self-adhesive sheet magnets 22, 24. A protective backing (not shown) is peeled away from the self-adhesive sheet magnets and sheet magnets of this type are applied to the speaker panel and to the bottom of the mounting plate 12 of the damping unit 10. This is schematically indicated in FIG. 6A. The relative positions of the damping unit 10, including the sheet magnet 22 secured to its bottom, and the sheet magnet 24 secured to the speaker panel, are shifted to the chart-selected values of X and Y. Tuning is checked using the accelerometer. The damping unit 10 is moved to vary the value of X until the optimum value has been found at which the resonance peak has been reduced to the lowest level. Then, without moving the absorber 10, the distance X is measured. This value found for X is the dimension of the tuning mounting plate or spacer plate 20 which should be used. The tuning mounting plate 20 is cut to the dimension X and the vibration damping unit 10 is then secured as shown in FIG. 2B and FIG. 6, in a permanent installation.

The above described preferred embodiment is intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for tuning a vibration damping unit upon installation of the unit on a panel of a speaker enclosure, comprising:

providing a vibration damping unit comprising a mounting plate or base plate, a series of vibration damping plates and a series of spacers between adjacent damping plates and between the mounting or base plate and an adjacent damping plate, the damping plates, spacers and mounting or base plate being rigidly secured together in such a way as to provide a freely extending, cantilevered length of each damping plate, providing a temporary spacer for positioning between the vibration damping unit and a speaker enclosure panel, temporarily securing the vibration damping unit, via its mounting plate, to the temporary spacer and securing the temporary spacer to the speaker enclosure panel, directing sound through a speaker of the speaker enclosure to thereby create vibrations in the speaker enclosure panel, positioning the vibration damping unit in a position so as to overhang the temporary spacer, leaving a portion of the vibration damping unit's mounting plate spaced from the speaker enclosure panel while another portion of the unit's mounting plate is secured against the temporary spacer which is in turn secured against the speaker enclosure panel, adjusting the length of overhang of the vibration damping unit relative to the temporary spacer while measuring vibrations of a selected frequency range in the speaker enclosure panel, until a overhang position of maximum attenuation in the selected frequency range is achieved, and providing a tuning mounting plate for permanent installation of the vibration damping unit, the tuning mounting plate having dimensions to effect the dimension of overhang determined to achieve maximum attenuation in the selected frequency range, and securing the vibration damping unit to the tuning mounting plate and securing the tuning mounting plate to the speaker enclosure panel.

2. The method of claim 1, wherein the vibration damping unit is secured together at one edge, with the edges of damping plates, spacers and the edge of the mounting plate secured tightly together at said one edge, and wherein the tuning mounting plate is secured to the mounting plate at a position of the mounting plate remote from said one edge.

* * * * *